Patented Oct. 25, 1932

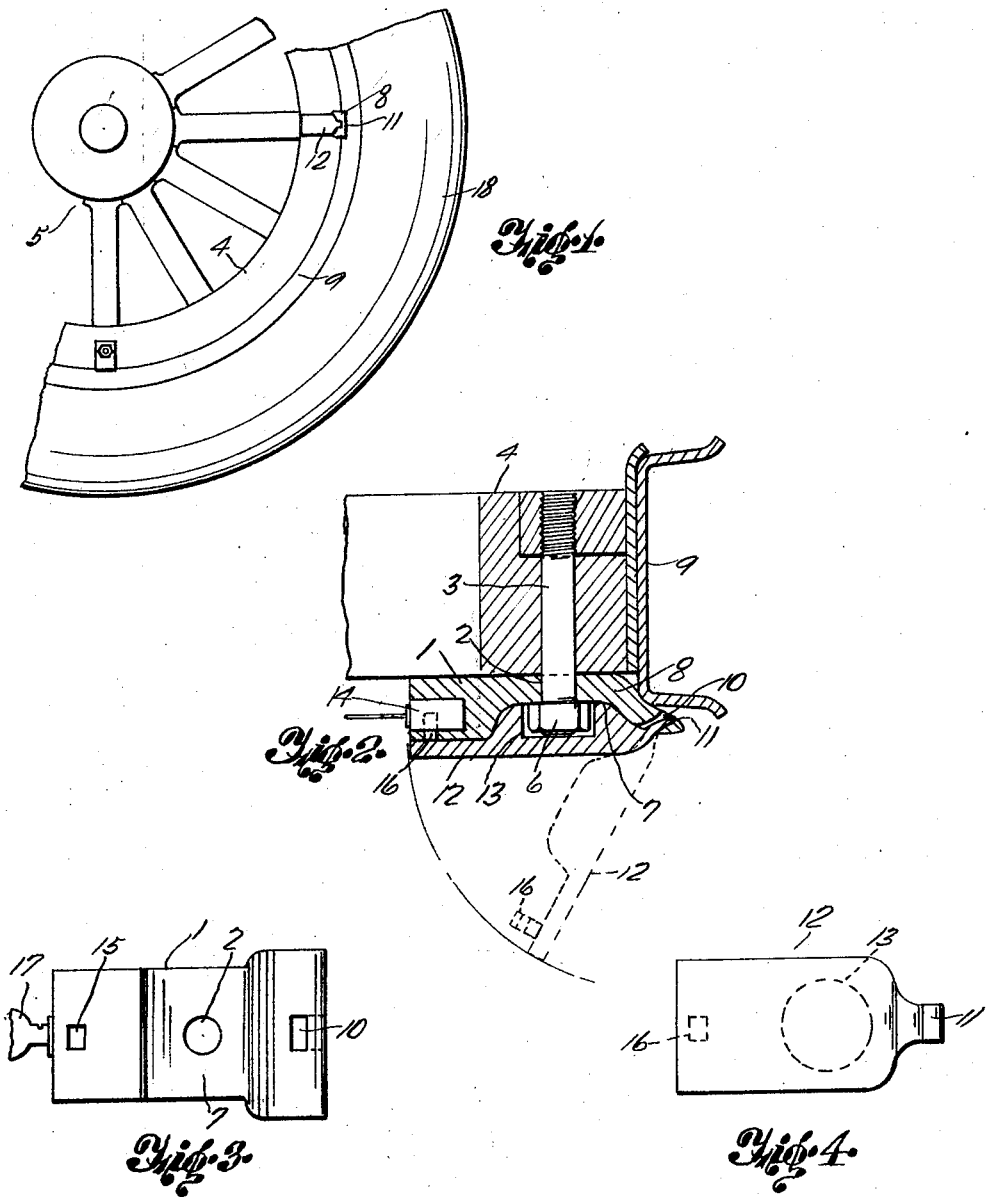

1,884,992

UNITED STATES PATENT OFFICE

PAUL J. GRABBE, OF LEWISTOWN, PENNSYLVANIA

RIM LUG NUT LOCK

Application filed August 26, 1931. Serial No. 559,383.

This invention is a rim lug nut lock for securing a demountable tire carrying rim in locked position upon the wheel rim.

One object of the invention is to provide a relatively simple, practical and efficient device for this purpose.

Another object is to provide such lock in a very compact form and so designed as to serve as a rim lug as well as a rim lock.

Still another object is to provide such device in such form and so mounted as that it will not protrude and become broken upon the wheel running close to a curb.

With the foregoing and such other objects in view as may appear, attention is called to the following specification and accompanying drawing, wherein:

Figure 1 is an elevation of a broken quarter of an automobile wheel, showing my lock mounted in place thereon over one of the lug nuts.

Figure 2 is a very greatly enlarged cross sectional detail thru the assembly shown in Figure 1, minus the tire, the cover of the lock lug being shown in solid lines in its closed position, and in dotted lines in its open position.

Figure 3 is an inside view, in plan, of the lock lug, the cover being removed.

Figure 4 is a plan view of the cover.

The invention comprises a lock lug 1 having an aperture 2 for engaging the rim bolt 3 passed thru the felloe 4 of the wheel 5, the bolt having the usual nut 6 threaded thereon. The lug 1 is cut away at its intended outer side, as shown at 7 so as to provide a receptacle for the nut. The lug 1 is formed with an angularly extended lip 8 adapted to impinge against the base of the removable rim 9 for holding same in place on the wheel. The lip 8 is pierced with a cover aperture 10 adapted to engage the nose 11 of the cover 12. This cover is formed generally complementarily to the lug 1 and at its inner side with a socket 13 for covering the nut 6. A key operated, spring lock 14 is provided in the lug 1 at the end opposite to the aperture 10, there being a keeper aperture 15 extended outwardly from the lock thru the face of the lug. A recessed lock bolt 16 is extended from the corresponding end of the cover 12. The alignment of the elements is such that when the nose 11 of the cover 12 is inserted in the aperture 10 of the lock lug 1 and the cover then pressed down, the socket 13 will engage the nut 6 and the keeper aperture 15 the bolt 16 the latter being automatically engaged and retained by the spring lock 14 in conventional manner. A key 17 inserted into the lock as shown enables the unlocking of the assembly.

By placing one of these nut locks over a rim bolt nut 6 oppositely to the air valve (not shown) of the wheel assembly, or two of the locks otherwise oppositely mounted upon the wheel, the rim 9 and tire 18 carried thereby, will be effectively locked against unauthorized removal.

It is thought the use and operation of the device will be fully understood from the foregoing description. And while the device is here represented as applied upon a rim nut, it is obvious without illustration that it may with equal effect be applied to the more centrally located nuts of a disc-wheel carrier, for locking such disc wheel to the carrier.

While I have herein described a certain specific method of constructing and assembling the elements of my invention, it is understood that same may be varied in minor details, not departing from the spirit of my invention as defined in the appended claim.

I claim:

In combination with a wheel, a removable rim mounted thereon and a rim bolt passed transversely thru the wheel felloe, the said bolt having a nut, a device of the kind described, comprising a lock lug for holding the rim in place on the wheel, the lug being additionally cut out at its outer face for engaging the bolt nut, and having a cover aperture in one end, a keeper aperture in the opposite end and a medial bolt aperture, and a complemental cover having a nose adapted to engage the cover aperture of the lock lug and a lock bolt adapted to enter the keeper aperture of the lug, and means for releasably locking said lock bolt in said keeper aperture.

In testimony whereof I affix my signature.

PAUL J. GRABBE.